United States Patent [19]

Swinkels et al.

[11] 4,049,770

[45] Sept. 20, 1977

[54] RECOVERY OF COPPER AND ZINC AS SULFIDES FROM COPPER-IRON SULFIDES

[75] Inventors: Godefridus Maria Swinkels, Rossland; Robert Arthur Furber, Edmonton; Edward Francis Godfrey Milner, Warfield; Roman Michael Genik-Sas-Berezowsky, Edmonton; Charles Ray Kirby, Rossland, all of Canada

[73] Assignees: Sherritt Gordon Mines Limited, Toronto; Cominco Ltd., Vancouver, both of Canada

[21] Appl. No.: 663,038

[22] Filed: Mar. 2, 1076

Related U.S. Application Data

[62] Division of Ser. No. 408,132, Oct. 19, 1973, Pat. No. 3,964,091.

[51] Int. Cl.$^2$ .......................... C01G 3/12; C01G 9/08; C01G 51/00; C01G 53/00
[52] U.S. Cl. ...................................... 423/37; 423/41; 423/101; 423/109; 423/140; 423/150
[58] Field of Search ............... 423/37, 109, 140, 150, 423/101, 41; 75/117, 119, 120

[56] References Cited

U.S. PATENT DOCUMENTS

| | | | |
|---|---|---|---|
| 2,872,306 | 2/1959 | Morrow | 423/140 |
| 3,053,651 | 9/1962 | McGauley | 423/37 |
| 3,655,538 | 4/1972 | Renken et al. | 423/37 |
| 3,816,105 | 6/1974 | McKay et al. | 423/37 |

OTHER PUBLICATIONS

Wadsworth et al., Editors, *Unit Processes in Metallurgy* Gorden and Breach, NY (1964) pp. 602, 609, 610.

*Primary Examiner*—O. R. Vertiz
*Assistant Examiner*—Brian E. Hearn
*Attorney, Agent, or Firm*—Arne I. Fors; Frank I. Piper; Robert F. Delbridge

[57] ABSTRACT

A process for recovery of zinc values contained in thermally activated iron containing copper and zinc sulfides in which said activated sulfides have been subjected to an acid leach in aqueous sulfuric acid to produce a solution of ferrous sulfate and a solids residue containing copper and zinc values. The solids residue containing copper and zinc values is reacted with an acidic copper sulfate solution to precipitate copper values as a simple copper sulfide with concurrent dissolution of iron and zinc values to form a solution of ferrous sulfate containing said dissolved zinc values and said solution of ferrous sulfate is separated from the simple copper sulfides and reacted with $H_2S$ for precipitation of zinc values therefrom as zinc sulfide. Any nickel and cobalt values present in said activated sulfides is dissolved in said solution of ferrous sulfate and reacted with the $H_2S$ at elevated temperature for selective precipitaton.

3 Claims, 1 Drawing Figure

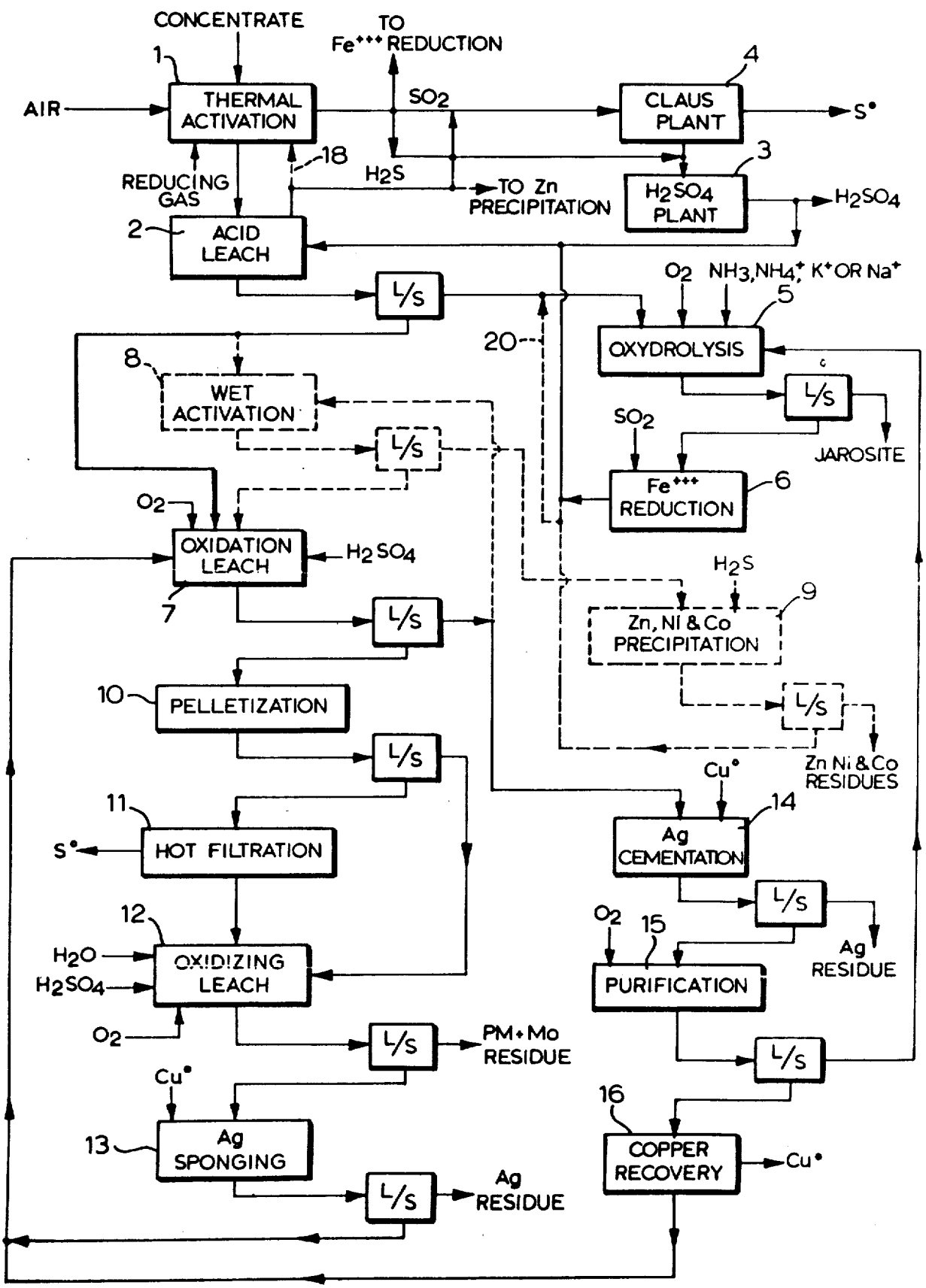

RECOVERY OF COPPER AND ZINC AS SULFIDES FROM COPPER-IRON SULFIDES

This is a division of application Ser. No. 408,132, filed Oct. 19, 1973, now U.S. Pat. 3,964,091.

BACKGROUND OF THE INVENTION

This invention relates to a hydrometallurgical process for treating iron containing metal sulfides such as pyritic metal sulfides containing non-ferrous metal values for separate recovery of said non-ferrous metal values and sulfur values wherein said sulfur values can be selectively produced as elemental sulfur or in the form of sulfuric acid to supply acid requirements of the process.

Many processes are known for the hydrometallurical extraction of desired metal values and sulfur from sulfide materials. These hydrometallurgical processes usually comprise the leaching of mineral concentrates at elevated temperatures and pressures in the presence of an oxidant in an acidic medium whereby the non-ferrous metal values can be extracted by dissolution and the sulfur can be removed in elemental form. Serious disadvantages of these known processes are the difficulties of dissolving pyritic copper and iron sulfides and of separating precipitated iron compounds from precious metals and dissolved non-ferrous metals. In most of the known processes, minerals such as chalcopyrite and pyrite are not directly soluble or require such severe leaching conditions that these processes become uneconomical.

Accordingly, it is a principal object of the present invention to provide a hydrometallurgical process for the treatment of pyritic metal sulfides containing pyrite, chalcopyrite, bronite, pyrrhotite and the like whereby the iron and non-ferrous metal values are rendered active for selective extraction and separate recovery.

It is another important object of the present invention to provide a substantially closed and self-supporting hydrometallurgical process for treatment of the aforesaid pyritic sulfides wherein sulfur values can be controllably produced as elemental sulfur or in the form of sulfuric acid to satisfy process acid requirements and to substantially obviate the discharge of sulfur-containing gases to the atmosphere.

A further important object of the invention is the provision of a process which permits selective bulk removal of iron values from pyritic metal sulfides to enable subsequent recovery of non-ferrous metal sulfides in enriched and activated form with attendant economies in operating and capital costs.

Another important object of the present invention is the provision of a process for the treatment of pyritic copper sulfides for the recovery of copper values and precious metals together with metal sulfides such as zinc, cobalt and nickel sulfide and molybdenite.

SUMMARY OF THE INVENTION

Accordingly, the process of the invention may be broadly described as follows. Ores and concentrates of pyritic metal sulfides are thermally activated by sequentially heating and reducing said sulfides in a countercurrent flow of a substantially non-oxidizing gas and a reducing gas respectively in a reactor whereby the reaction products of the reducing gas and sulfides together with liberated labile sulfur are controllably combusted with oxygen to satisfy heat requirements of the thermal activation process and to convert sulfur values to $SO_2$ gas. The major portion of the sulfidic iron present in the sulfides is converted to an acid leachable form and non-ferrous metal values are activated and rendered amenable to an acid oxidation leach. The thus activated sulfides are subjected to an acid leach in aqueous sulfuric acid for production of ferrous sulfate and evolution of $H_2S$ gas which are separated from the solid sulfide residue containing concentrated non-ferrous metal values. The ferrous sulfate is oxidized and hydrolysed to precipitate the iron, which is removed from the system, and to regenerate sulfuric acid which is recycled to the acid leach. At least a portion of the $SO_2$ gas from said heating step and at least a portion of the $H_2S$ from the acid leach are converted to sulfuric acid to satisfy the acid requirements of the process, and remaining $SO_2$ is combined and catalytically reacted with remaining $H_2S$ to produce elemental sulfur.

The solids residue from the acid leach, containing enriched copper and other non-ferrous metal values, can be subjected directly to an acid oxidation leach in aqueous sulfuric acid in which copper values are carried into solution as a pregnant copper sulfate liquor which is purified and is subjected to recovery of copper by electrowinning or hydrogen reduction. Remaining oxidation leach residue can be further processed to yield elemental sulfur and a concentrate containing precious metals and any molybdenum present in the feed sulfides.

Alternatively, the solids residue from the acid leach can be subjected to a wet activation leach with copper sulfate, prior to the acid oxidation leach, for further and selective activation of copper values and for dissolution of iron values and certain non-ferrous metal valuwes, such as zinc, nickel and cobalt, for their subsequent recovery.

BRIEF DESCRIPTION OF THE DRAWING

The process will now be described with reference to the accompanying flowsheet which schematically illustrates the steps thereof.

DESCRIPTION OF THE PREFERRED EMBODIMENT

Cres and concentrates suitable for treatment for recovery of non-ferrous metal values can be low grade pyritic copper sulfides, such as low grade concentrates of bornite, chalcopyrite, and mixtures thereof with pyrrhotite and pyrite, and can contain precious metals and other metal values such as zinc, cobalt, nickel and lead sulfides and molybdenite, as well as small amounts of arsenic, antimony, selenium, tellurium and tin.

Particle size of concentrate has been found to be not critical for successful processing, the normal degree of comminution necessary for beneficiation usually being satisfactory for rapid activation and leaching.

The concentrate is fed to the thermal activation step 1 which consists of a two-stage heating and reduction operation preferably carried out in a countercurrent reactor such as, for example, a vertical multiple hearth roaster. The concentrate is fed to a heating zone in the top of the reactor and travels downwardly through the hearths countercurrent to an ascending flow of a hot inert or substantially non-oxidizing gas, to be described hereinbelow, wherein the temperature of the concentrate is raised to a temperature in the range of from about 550° C. to a temperature not exceeding the fusion point of the concentrate, preferably from about 650° to about 800° C. Heating of the copper concentrate to this temperature range results in thermal decomposition of the pyritic sulfides with the liberation of labile sulfur.

The reactions may, for example, be expressed as follows:

$$5\ CuFeS_2 \rightarrow 5\ CuFeS_{1.8} + S^0 \quad (1)$$
$$FeS_2 \rightarrow FeS_{1.05} + 0.95\ S^0 \quad (2)$$

It is understood that the exact composition, and particularly the sulfur content of the delabilized sulfides, may vary and is dependent on process conditions.

The delabilized sulfides then descend through a reducing zone of the roaster having a countercurrent ascending flow of a reducing gas therein capable of accepting sulfur, such as hydrogen, or a hydrogen containing gas such as, for example, ammonia synthesis gas, reformed natural gas or methane, which reacts with the delabilized sulfides at temperatures within the range of from about 550° C. to a temperature not exceeding the fusion point of the concentrate, preferably from about 650° to 800° C. to form a bornite-pyrrhotite type mixture, as follows:

$$5CuFeS_{1.8} + H_2 \rightarrow Cu_5FeS_4 + 4\ FeS + H_2S \quad (3)$$
$$FeS_{1.05} + 0.05\ H_2 \rightarrow FeS + 0.05\ H_2S \quad (4)$$

The copper iron sulfide formed according to reaction (3) has the approximate empirical formula of bornite but its actual composition resembles a mixture of a bornite type material and ferrous and cuprous sulfide. The pyrrhotite formed according to reactions (3) and (4) is readily acid leachable.

We have found that adequate utilization of the hydrogen in the reduction zone can be achieved by countercurrent contacting of the hydrogen with the delabilized sulfides.

The H$_2$S produced rises into the aforesaid heating zone for mixture with air or an oxygen containing gas in an amount only sufficient, i.e. a substantially stoichiometric amount of oxygen, for controlled combustion of the H$_2$S, H$_2$ and labile sulfur to form SO$_2$ and H$_2$O which are discharged from the heating zone, and to supply heat requirements for the heating zone. H$_2$S from a subsequent acid leach may be introduced if desired as indicated by the broken line 18 in the drawing to the heating zone to supplement heat requirements when processing low-pyrite metal sulfides. In case of excess heat the temperature of the solids may be controlled by injection of water, by removal of combustible gases, such as H$_2$, H$_2$S and sulfur vapor, or by injecting air at points close to the gas discharge end of the reactor.

It is important that the solids in the heating zone be maintained in a substantially neutral or partially reducing state to prevent the formation of metal oxides.

The atmosphere in the heating and delabilizing zone is maintained only sufficiently oxidizing by the addition of, for example, only enough air or an oxygen containing gas to permit burning of the combustible gases and labile sulfur, and to heat the concentrate to the desired delabilizing and reducing temperatures. The atmosphere in the heating zone is defined as preferably being a substantially neutral or partially reducing atmosphere in relation to the solids being treated and containing less than 5% by volume oxygen.

It is important in the heating and reducing zones that the concentrate not be heated to a temperature at which phenomena such as sintering and bridging may occur. By agglomerating the feed prior to introduction to the thermal activation step, such as for example by pelletizing or briquetting the feed, thermal activation can be carried out at an elevated temperature while minimizing sintering and bridging. We have found that a close temperature control can be achieved and maintained by adding controlled amounts of air at spaced intervals along the length of the heating zone of the reactor. For example, a concentrate temperature of about 700° C. can be established by selectively adding air or other oxygen containing gas along the heating zone such that the gaseous atmosphere is heated to a temperature not exceeding 760° C. Utilization of hydrogen gas and acid solubility of resultant iron values decrease at lower temperatures and thus it is desired to maintain the concentrate temperature, during the thermal activation, as high as possible without occurrence of the above named phenomena. Some of the As, Sb and Se present in the concentrate is volatilized in the thermal activation step.

A typical pelletized copper concentrate, analyzing 23.4% copper, 30.2% iron, 4.8% zinc and 35.0% sulfur, was continuously processed in a multiple hearth roaster by heating of the concentrate in a upper heating zone of the roaster by the controlled combustion of hydrogen and gaseous reaction products described above with air to achieve hearth temperatures ranging from 640° to 735° C. The heated concentrate descended through a hydrogen atmosphere for a total retention time of 30 minutes. Samples of the discharge solids were subjected to acid leaching, to be described below, resulting in iron extractions that increased with higher temperatures, as shown in Table 1.

TABLE 1

| Test | Average Hearth Temperature ° C. | Fe Extraction % |
|---|---|---|
| 1. | 640 | 56 |
| 2. | 700 | 63 |
| 3. | 705 | 73 |
| 4. | 735 | 83 |

The thermally activated concentrate is fed to an acid leach 2 where it is mixed with a solution containing from about 60 to 300 gpl free sulfuric acid, preferably in an amount of up to about 20% on excess of stoichiometric requirements to convert iron to FeSO$_4$, at a temperature of from about ambient to about 200° C. Preferably the leach is conducted at a temperature of from about 30° to 100° C. at atmospheric pressure, for a time sufficient to leach from about 60 to about 90% iron as FeSO$_4$, as represented by the following general equation:

$$Cu_5FeS_4 + FeS + H_2SO_4 \rightarrow Cu_5FeS_4 + FeSO_4 + H_2S \quad (5)$$

The free acid content of the final solution drops to about 15 gpl, usually from an initial content of about 130 gpl, before leaching of iron ceases, to produce a solution containing from about 50 to 90 gpl iron as FeSO$_4$. This bulk removal of iron leaves an iron depleted leach residue containing copper and iron in a molar ratio of at least about 1 : 1, usually in the range of from about 2 : 1 to 15 : 1, which is suitable for an acid oxidation leach. Temperature is not critical within the preferred range once the reaction has been initiated, a temperature of about 30° to 40° C. usually being required to start the reaction, with temperatures in excess of 100° C. decreasing the solubility of the FeSO$_4$.

To control foaming, the reaction can be moderated by slow acid addition or by the use of two-stage countercurrent leaching. If necessary, chemical or mechanical foam breakers may be used. Two-stage countercurrent leaching is also preferred in that iron extraction is enhanced and the FeSO$_4$ liquor has low acidity which is desirable for the subsequent iron precipitation step. The first stage is conducted in filtrate from the second stage containing from about 60 to about 150 gpl free sulfuric acid and about 60 gpl Fe for a time sufficient to obtain an iron extraction of from about 60 to 70% of the acid leachable iron with iron content in the filtrate of about 80 to 90 gpl and free acid of about 1 to 5 gpl. The solids residue from the first stage is charged to the second stage where it is contacted with sulfuric acid generated in other steps of the process, to be described, containing in excess of 200 gpl free sulfuric acid. The slurry is reacted for a time sufficient to extract the remainder of the acid leachable iron and the filtrate is recycled to the first stage leach.

The filtrate from the first stage is fed to an iron removal and acid regeneration step. The residue from the second stage is suitable for a subsequent acid oxidation leach, or if necessary, for a wet activation leaching step prior to the acid oxidation leach to remove additional iron and to provide a copper free solution suitable for the removal of zinc to control zinc build-up in the system.

Samples of roaster discharge solids thermally activated as described above were repulped with water and concentrated sulfuric acid, equivalent to a H$_2$SO$_4$ : Fe molar ratio of 1.8 : 1.0, was added stagewise to simulate two-stage atmospheric leaches extending over a period of 1 hour. Temperature was maintained at about 100° C. Iron extractions up to 81.3% were obtained with copper to iron molar ratios in the residue of about 4 : 1.

Hydrogen sulfide from the acid leach reaction and SO$_2$ in the exit gases from the heating zone of the thermal activation are utilized in various steps of the process with excess being converted to elemental sulfur. Portions of the H$_2$S and SO$_2$ are fed to an acid plant 3, well known in the art, for the production of sulfuric acid, after combustion of the H$_2$S, in an amount sufficient to satisfy the acid requirements of the process. Excess H$_2$S and SO$_2$ are fed to a Claus plant 4, also well known in the art, for catalytic reaction and production of elemental sulfur which is stable and relatively inert and thus suitable for storage or shipment. Unconverted H$_2$S from the Claus plant is combusted to SO$_2$ and fed to the acid plant. A small quantity of SO$_2$ is used in the reduction of ferric iron, to be described and small quantities of H$_2$S may be used in the thermal activation and in the precipitation of zinc, cobalt and nickel, as required.

The acid leach liquor containing from 50 to 90 gpl iron as FeSO$_4$ and from 5 to 60 gpl free H$_2$SO$_4$ is fed to the oxydrolysis step 5 where iron is precipitated from the solution in a one-stage oxidation and hydrolysis operation and sulfuric acid is produced. Preferably iron compounds of the jarosite type are precipitated. Ammonia or a suitable ammonium or alkali-metal compound is added to the leach liquor in an amount of from about 50 to 120%, preferably from about 80 to about 100%, of stoichiometric requirements, together with an oxygen bearing gas which provides an oxygen partial pressure in the range of from about 50 to about 200 psi, preferably about 150 psi. A temperature above about 140° C., preferably in the range of from about 140° to about 230° C., is maintained and the oxydrolysis of iron in the presence of cations such as ammonium, sodium or potassium is permitted to proceed for 30 to about 90 minutes to produce jarosite ( [A Fe$_3$(SO$_4$)$_2$(OH)$_6$] where A = NH$_4^+$, Na$^+$ or K$^+$) and a dilute sulfuric acid. The sulfuric acid solution containing some residual iron is recycled to the acid leach step after reduction of ferric iron to the ferrous state with SO$_2$ in step 6. The reduction is carried out according to well known methods at a temperature of about 70° to 80° C. under atmospheric pressure.

A leach liquor, containing 3.7 gpl copper, 51.3 gpl iron and 23.0 gpl free sulfuric acid, to which had been added 90% of the stoichiometric quantity of NH$_4^+$ ion (as NH$_4$OH) required to form ammonium jarosite, was subjected to oxydrolysis by heating with agitation in a pressure vessel at a temperature maintained at 180° C. under 180 psi of oxygen partial pressure. The mean residence time of solution in the pressure vessel was 42 minutes. The filtrate of the resulting product analyzed 2.5 gpl copper, 3.8 gpl iron, and 36.2 gpl sulfuric acid. The solids analyzed <0.1% copper, 34.7% iron and 13.1% total sulfur.

The thermal activation and acid leach steps, with integrated production of elemental sulfur and sulfuric acid, and oxydrolysis of the FeSO$_4$ liquor for production of sulfuric acid removal of the major portion of the iron from the system, form an essentially closed system which can be readily balanced to supply process acid and heat requirements with excess sulfur produced in a stable elemental form without the discharge of noxious fumes and gases to the atmosphere.

The solids residue from the acid leach can be directly fed to an acid oxidation leach 7, or optionally fed to a wet activation leach step 8 shown by broken lines in the drawing, if the acid leach residues contain; beside copper values, significant amounts of zinc, lead, nickel and cobalt values and residual iron values. In leach 8, the total amount of iron which can be selectively removed from the process can be increased significantly, the recovery of precious metals from the leach residue can be facilitated due to iron removal, the copper values are further concentrated, and a control over the build-up of zinc in the process, which is the most common attendant metal, can be exercised by precipitation of dissolved zinc in a subsequent step, as will become apparent as the description proceeds.

In the wet activation leach 8, the solids residue from the acid leach is reacted with an acidic copper sulfate solution for replacement by copper of residual iron and any zinc, lead, nickel and cobalt values present in the said solids residue with production of activated copper sulfides, lead sulfate and a solution of ferrous sulfate and a sulfate of any of said zinc, nickel and cobalt values present. For example, iron in the bornite-like material is replaced by copper from the acid CuSO$_4$ solution according to the following equation:

$$Cu_5FeS_4 + CuSO_4 \rightarrow 2\ Cu_2S + 2\ CuS + FeSO_4 \qquad (6)$$

Iron is removed from the acid leach residue down to a level of from 2 to 10% Fe in the activated copper sulfides, at a copper utilization corresponding to a Cu (precipitated)/Fe (solubilized) molar ratio of close to unity.

The wet activation leach is conducted at a temperature within the range of from about 140° to 200° C., preferably about 160° C., under autogenous pressure, and at a pH of about 0.5 to 2, with a portion of the acid CuSO$_4$ solution from the acid oxidation leach step 7. The acid CuSO$_4$ solution contains from about 20 to 100 gpl Cu, from about 3 to 15 gpl Fe, from about 5 to 35 gpl H$_2$SO$_4$, and about 20 gpl Zn.

Ferric iron in the feed solution to the wet activation leach may lead to the formation of elemental sulfur as exemplified by the following equation:

$$Fe_2(SO_4)_3 + CuS \rightarrow CuSO_4 + 2 FeSO_4 + S^0 \quad (7)$$

The elemental sulfur reacts further to produce sulfuric acid as exemplified by one of several reactions:

$$S^0 + 3 Fe_2(SO_4)_3 + 4 H_2O \rightarrow 6 FeSO_4 + 4 H_2SO_4 \quad (8)$$

The copper sulfate formed according to (7) must be subsequently recovered and the sulfuric acid generated according to (8) undesirably adds to the acidity of the system. The amount of ferric iron fed to the wet activation leach therefore should be kept to a minimum to avoid both the dissolution of copper and the production of excess acid.

The reactions involving Zn-, Pb-, Ni- and Co-sulfides also occur as follows:

$$MeS + CuSO_4 \rightarrow CuS + MeSO_4 \quad (9)$$

where Me = Zn, Pb, Co, or Ni. These reactions, which consume an amount of $CuSO_4$ dependent on the amount of these sulfides present, provide an effective means for dissolution and subsequent recovery or removal of Zn, Co and Ni from the system while Pb precipitates as its sulfate. For example, copper concentrates often contain sphalerite which is at least partly leached in the wet activation leach 8.

Solids residue from the preceding acid leach was mixed with an acidic copper sulfate solution containing 70 gpl copper as copper sulfate and agitated in a closed vessel for 1 hour at a temperature of 160° C. The amount of copper provided in solution was equivalent to a copper to iron molar ratio of 1.04 : 1, or copper to iron + zinc molar ratio of 0.85 : 1. The solids product separated from the solution analysed 55.7% copper, 7.15% iron, 2.58% zinc and 23.9% total sulfur; indicating iron and zinc extractions from the solids residue of 54.7% and 39.9% respectively. The combined iron extraction in the acid and the wet activation leaches was 87.2% and the combined zinc extraction from these leaches was 70%.

The solution from the wet activation leach 8 is a substantially copper-free $FeSO_4$ liquor which is subsequently stripped of zinc in zinc precipitation 9 wherein a partial pressure of $H_2S$ of from about 30 to about 100 psi, preferably about 100 psi, at a temperature of from ambient to about 100° C., is maintained to precipitate the zinc as a concentrate of ZnS. Zinc removal from solution decreases with increasing acidity. A temperature of about 70° C., a normal operating temperature, and acidities provided by free acid contents in the range of from about 20 to 40 gpl sulfuric acid, are acceptable for zinc removal. The remaining acid $FeSO_4$ liquor, containing less than about 2 gpl Zn, is returned to the acid leach to pick up more iron as $FeSO_4$, or alternatively is fed to oxydrolysis 5 for removal of iron, as indicated by the broken line 20 in the drawing. Cobalt and nickel in the solution from the wet activation leach 8 do not precipitate with $H_2S$ under the conditions maintained in zinc precipitation 9, hence, substantially complete separation is possible. If desired, nickel and cobalt can be precipitated from the residual solution from the zinc precipitation by raising the temperature of the solution to as high as 150° C., preferably in the range of from about 100° to 150° C., and maintaining a partial pressure of $H_2S$ of about 100 psi. A concentrate of cobalt and nickel sulfide is recovered for further processing.

The operation of the zinc precipitation was typified by treating a representation solution from the wet activation leach, containing 0.019 gpl copper, 41.3 gpl iron, 13 gpl zinc and 58 gpl sulfuric acid, by agitation in a pressure vessel for 30 minutes at 70° C. under 100 psi pressure of $H_2S$ gas for precipitation of zinc sulfide. The resulting slurry was filtered to yield a filtrate which contained 1.1 gpl zinc. The solids analyzed 60.8% zinc, 32.4% sulfur, 0.15% copper and 0.15% iron.

The activated copper sulfides from the wet activation leach 8, or the solids residue from acid leach 2, is fed to a single or multi-stage acid oxidation leach 7 and leached with return acid from copper recovery 16 according to the following equation:

$$Cu_xFe_yS_z + (x+y)H_2SO_4 + \left(\frac{x+y}{2}\right)O_2 \longrightarrow$$
$$xCuSO_4 + yFeSO_4 + (x+y)H_2O + zS^\circ \quad (10)$$

which x, y and z have values in combinations covering various copper sulfides and copper-iron sulfides. For example, for $Cu_2S$, x has the value 2, y has the value 0 and z has the value 1. Under oxidizing conditions the ferrous sulfate usually is at least partially oxidized to ferric sulfate. The main reaction taking place in the oxidizing leach is the dissolution of copper as cupric ion and the oxidation of sulfide sulfur to elemental sulfur. Sulfides such as those of silver and molybdenum are relatively unreactive and, together with precious metals, substantially remain as solids in the leach residue together with the gangue materials and elemental sulfur. Zinc and lead sulfides will react similarly to the copper to form $ZnSO_4$ and $PbSO_4$. The acid for this leach is return acid from a subsequent copper recovery step containing from about 40 to 200 gpl $H_2SO_4$, from about 0 to 40 gpl cupric ions and from about 0 to 10 gpl ferrous ion. The composition of the return acid will depend largely on the method of copper recovery used. If, for example, hydrogen reduction is employed, the return acid may contain from about 80 to 120 gpl $H_2SO_4$, from about 10 to 25 gpl copper as cupric ions and from about 1 to 5 gpl iron as ferrous ions.

To achieve high rates of reaction, the temperature should be controlled just below the melting point of elemental sulfur. The upper limiting temperature thus is that temperature at which the elemental sulfur melts, i.e. 113° to 119° C., causing occlusion of unreacted sulfides and thereby inhibiting the leaching reaction. We have found in two-stage countercurrent oxidation leaching that by maintaining the temperature in a first stage leach in the lower end of the range, i.e., within the range of from about 70° to 100° C., the blinding of particle surfaces is effectively prevented, while the temperature in the second stage of the leach may be maintained in the higher end of the range, i.e., within the range of from about 105° to about 110° C.

The oxidation leach can be performed under a wide range of pressures. We have found that in the presence of an oxygen bearing gas the pressure in the oxidation leach may be up to about 400 psi partial pressure of oxygen to provide satisfactory extractions. Pressures above 400 psi improve the leaching rates marginally and do not justify the additional capital costs for higher pressure equipment. Thus, it is possible to conduct the oxidation leach with an oxygen bearing gas providing a partial pressure of oxygen in the range of from about atmospheric to about 400 psi, preferably at about 200 psi. An effective oxidation leach can be obtained by maintaining the pressure in a first stage of the oxidation leach in the lower end of the above stated pressure range at from substantially atmospheric to about 300 psi, and to maintain the pressure in the second stage in the higher end of the range of from about 100 to about 400 psi.

The oxygen bearing gas can be air, oxygen, or mixtures thereof, preferably oxygen. We have found that a substantial portion of the copper sulfides such as $Cu_2S$, $CuS$ and $Cu_5FeS_4$ will be extracted in the presence of the oxygen bearing gas in the first stage oxidation leach while remaining copper sulfides will be extracted in the second stage leach.

The retention time of the reaction mixture in each of the stages of the oxidation leach may vary within a broad range and is dependent not only on the required extraction in each stage but also on the conditions in each stage. Thus we have found that at higher temperatures and pressures the retention time may be between 10 minutes to 30 minutes while at lower temperatures and pressures the retention time may vary between 1 hour and 12 hours.

The acidity of the reaction mixture in the oxidation leach is critical and must be carefully controlled to ensure a high dissolution of the copper as well as to prevent the precipitation of iron compounds and associated loss of silver and molybdenum. If the pH of the reaction mixture rises too high, the iron in the solution will hydrolyse and precipitate, and valuable silver and molybdenum which are present in the reaction mixture will be occluded by this precipitate and will leave the process in the tailings from the subsequent flotatiion step. The acidity is controlled by the addition of return acid, or sulfuric acid from the acid plant, to prevent the precipitation of iron.

An oxidation leach was conducted as follows. Solids residue from the preceding wet activation leach containing 53.4% copper, 11.6% iron, 2.14% zinc and 24.8% total sulfur were repulped with an electrolyte containing excess sulfuric acid such that the sulfuric acid to copper + zinc + iron molar ratio was 1.05. The slurry was agitated in a pressure vessel with an oxygen partial pressure of 200 psi at a temperature initially maintained at 95° C. and raised to 110° C. during the latter portion of the acid oxidation leach. Table 2 indicates analyses of the solid and liquid constituents of samples taken at 1 hour intervals from the commencement of feed.

which is treated for recovery of the above named values.

The discharge slurry, or the concentrate from flotation is subjected to a pelletization step 10. Pelletizing of the elemental sulfur is effected by heating the slurry to about 125° C. under constant agitation for a time sufficient to permit the elemental sulfur to melt and coalesce and then cooling to about 90° C. for a time to enable the pellets to solidify. These pellets are separated by standard techniques. For instance the resulting slurry is screened on a 35 mesh Tyler screen and the +35 mesh pellets washed to remove slimes. The −35 mesh pellets and slimes are subjected to centrifugal separation in a hydrocyclone. The +35 mesh pellets and hydrocyclone underflow are heated to from 120° to 140° C. and subjected to hot filtration 11 at a pressure of about 20 air pressure to produce an elemental sulfur product, which comprises from 80 to 95% of the sulfur present in the discharge slurry from the oxidation leach.

The slimes and filtercake from filtration 11, consisting of a small amount of unreacted copper sulfides, hydrolysed iron, sulfur and gangue minerals, together with precious metals, tin, lead sulfate and molybdenum, can be processed for further metal recovery by several techniques. For example, the slurry can be subjected to an oxidizing acid leach 12 at a temperature in the range of from about 200° to 250° C. and an oxygen partial pressure in the range of from about 150 to 250 psi to dissolve copper values as $CuSO_4$ and iron as $FeSO_4$, in which the latter oxidizes and hydrolyses to basic ferric sulfates or hydrated oxides. These iron products can be redissolved, if desired, at 90° C. with an $SO_2$ treatment (not shown) leaving a final residue containing precious metals, tin, lead sulfate and molybdenum. Any silver that is solubilized can be recovered by cementation with copper powder in a silver sponging step 13. The remaining liquor containing copper and iron values and sulfuric acid, together with residual acid from the subsequent copper recovery, to be described, is recycled to the oxidation leach 7.

The pregnant copper liquor from the acid oxidation leach 7, containing about 60 to 100 gpl copper, about 5 to 25 gpl sulfuric acid and about 3 to 15 gpl ferric ion, is purified by a two-stage process, preparatory to recovery of copper values, by removal of major portions of silver, selenium, tellurium, arsenic, antimony, tin and iron. Silver is first precipitated from the pregnant liquor by the addition of copper powder in silver cementation 14. Copper powder is added in an amount of about 10% in excess of stoichiometric requirements to reduce ferric iron to ferrous iron and at a temperature in the range of

TABLE 2

| Time | Filtrate (gpl) | | | | Residues (%) | | | | Extractions (%) | | |
|---|---|---|---|---|---|---|---|---|---|---|---|
| (Hrs.) | Cu | Zn | Fe | $H_2SO_4$ | Cu | Zn | Fe | S° | Cu | Zn | Fe |
| Feed | 20 | 20 | 5 | 145 | 53.4 | 2.14 | 11.6 | 24.8 | | | |
| 1 | 75.4 | 21.4 | 10.1 | 43.8 | 5.61 | 1.69 | 9.6 | 37.8 | 95.6 | 67.0 | 65.3 |
| 2 | 80.8 | 22.4 | 15.6 | 24.0 | 2.23 | 0.73 | 3.9 | 61.5 | 98.6 | 88.3 | 88.4 |
| 3 | 83.4 | 23.4 | 18.3 | 16.0 | 0.99 | 0.17 | 1.0 | 70.3 | 99.4 | 97.5 | 97.2 |
| 4 | 82.0 | 22.8 | 18.0 | 13.9 | 0.79 | 0.08 | 0.7 | 67.3 | 99.5 | 98.8 | 97.9 |

The solids in the discharge slurry from the oxidation leach, containing elemental sulfur, unreacted sulfides, lead sulfate, molybdenum and precious metals, are separated from the leach copper liquid and are treated for recovery of these values. Dependent on the quantity of gangue materials in the discharge slurry, the slurry may be subjected, if desired, to flotation (not shown) to separate the insoluble gangue material from a concentrate from about ambient to about 100° C., preferably from 60° to 70° C., whereby the silver content is reduced to less than 5 mgpl, some selenium is removed, and the iron is reduced to the ferrous state. The liquor is treated in purification 15 by heating to from about 150° to 250° C., preferably to about 200° C., under an oxygen partial pressure of from about 20 to about 200 psi, preferably about 150 psi, to precipitate iron as ferric oxide and basic sulfate and to remove most arsenic, antimony, tellurium and selenium. It is important that the pregnant liquor does not contain more than 10 gpl free acid, corresponding to a pH of about 1-2. Any excess free acid therefore is neutralized with CaO which can be injected directly into the purification reactor.

The two-stage purification is exemplified by the following example. Solution from the oxidation leach, containing 69 gpl copper, 4.9 gpl iron (1.2 gpl $Fe^{+++}$ and 3.7 gpl $Fe^{++}$), 21.4 gpl sulfuric acid, 1.0 mgpl silver and 0.38 mgpl selenium, was mixed with 6 gpl copper dust, stirred in the absence of air for 20 minutes at 60° to 70° C., and then filtered through a bed of copper powder. The filtrate analyzed 67 gpl copper, 4.4 gpl iron (0.1 gpl $Fe^{+++}$ and 4.3 gpl $Fe^{++}$), 19 gpl sulfuric acid, 0.2 mgpl silver and 0.25 mgpl selenium. The substantially silver-free solution was further processed by first neutralizing the sulfuric acid to 10 gpl by the addition of lime, filtered, and then agitated in a pressure vessel at a temperature maintained at 200° C. under a partial pressure of oxygen of 150 psi for a retention time of 35 minutes. The resulting slurry was filtered to yield a solids residue which contained 2.1% copper, 52.6% iron and 4.6% total sulfur. The filtrate analysed 66 gpl copper, 0.5 gpl iron, 17.6 gpl sulfuric acid, 0.3 mgpl silver and 0.12 mgpl selenium. The filtrate substantially free of iron, silver and selenium, was suitable for subsequent copper recovery.

The iron oxide slurry is thickened, filtered, washed free of copper and fed to oxydrolysis step 5. The pregnant liquor, essentially a pure $CuSO_4$ solution containing less than 1 gpl iron, can be fed to copper recovery 16 for recovery of metallic copper by electrowinning or by hydrogen reduction.

Pure copper cathodes can be recovered from the purified $CuSO_4$ pregnant liquor in a standard electrowinning tank house. The copper containing liquor is diluted with a recycle of spent electrolyte for a cell liquor feed containing about 45 gpl Cu and 100 gpl $H_2SO_4$ and fed to electrolytic cell for production of cathodes at a current density in the range of from about 180 to 400 amperes per square meter and a cell discharge liquor of 20 gpl Cu and about 140 gpl $H_2SO_4$. Spent electrolyte is recycled to the oxidation leach step 7.

Alternatively, copper can be won from the $CuSO_4$ pregnant solution by hydrogen reduction. We have found that a direct reduction with hydrogen gas at elevated temperature and pressure in a continuous fashion is very rapid. The reaction is carried out on a continuous basis in a suitable reaction vessel with agitation at a temperature of about 130° to 200° C. under a nitrogen partial pressure of about 300 to 400 psi. The retention time required for the reduction of copper from about 80 gpl to the target residual amount of 20 gpl is not more than about 30 minutes. Residual solution is recycled to the oxidation leach step 7.

What we claim as new and desire to protect by letters patent of the United States is:

1. A process for recovery of zinc values contained in thermally activated iron containing copper and zinc sulfides in which said activated sulfides have been subjected to an acid leach in aqueous sulfuric acid to produce a solution of ferrous sulfate and a solids residue containing copper and zinc and separation of said solution containing ferrous sulfate from said solids residue which comprises: reacting said solids residue containing copper and zinc with an acidic copper sulfate solution containing from about 20 to about 100 gpl copper and from about 5 to about 35 gpl sulfuric acid at a temperature in the range of from about 140° to about 200° C. under autogenous pressure whereby copper values are precipitated as a simple copper sulfide with concurrent dissolution of iron and zinc values to form a solution of ferrous sulfate containing said dissolved zinc values, separating said solution of ferrous sulfate from the simple coppeer sulfides, and reacting said solution with $H_2S$ for precipitation of zinc values therefrom as zinc sulfide.

2. A process as claimed in claim 1, reacting said solution of ferrous sulfate containing dissolved zinc values with $H_2S$ at a temperature of from ambient temperature to 100° C. with a partial pressure of $H_2S$ of from about 30 to about 100 psi.

3. A process as claimed in claim 1, for separate recovery of any nickel and cobalt values contained in the thermally activated iron containing copper and zinc sulfides which comprises reacting the solution of ferrous sulfate containing dissolved zinc, nickel and cobalt values with $H_2S$ at a temperature of from ambient temperature to 100° C. with a partial pressure of $H_2S$ of from about 30 to about 100 psi for precipitation of zinc sulfide, and raising the temperature of the solution up to 150° C. at a partial pressure of $H_2S$ of about 100 psi for precipitation of cobalt and nickel sulfides.

* * * * *